(12) United States Patent
Wu et al.

(10) Patent No.: US 10,642,324 B2
(45) Date of Patent: May 5, 2020

(54) COVER FOR DEVICES (71) Applicant: HEWLETT-PACKARD DEVELOPMENT COMPANY, L.P., Houston, TX (US)

(72) Inventors: Kuan-Ting Wu, Taipei (TW); Ai-Tsung Li, Taipei (TW); Ya-Ting Yeh, Taipei (TW); Kevin Voss, Houston, TX (US); Michael Delpier, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 35 days.

(21) Appl. No.: 16/067,766

(22) PCT Filed: Apr. 6, 2016

(86) PCT No.: PCT/US2016/026202
§ 371 (c)(1),
(2) Date: Jul. 2, 2018

(87) PCT Pub. No.: WO2017/176262
PCT Pub. Date: Oct. 12, 2017

(65) Prior Publication Data
US 2019/0025895 A1 Jan. 24, 2019

(51) Int. Cl.
*B32B 3/10* (2006.01)
*G06F 1/20* (2006.01)
*B32B 33/00* (2006.01)

(52) U.S. Cl.
CPC .............. *G06F 1/203* (2013.01); *B32B 33/00* (2013.01); *G06F 2200/1633* (2013.01); *Y10T 428/24802* (2015.01)

(58) Field of Classification Search
None
See application file for complete search history.

(56) References Cited

U.S. PATENT DOCUMENTS

| 5,869,172 | A | 2/1999 | Caldwell |
| 6,991,024 | B2 | 1/2006 | Goodson et al. |
| 7,846,522 | B2 | 12/2010 | Kaminski et al. |
| 8,905,691 | B2 | 12/2014 | Ma et al. |
| 8,993,706 | B2 | 3/2015 | Schubert et al. |

(Continued)

FOREIGN PATENT DOCUMENTS

| CN | 104735941 | 6/2015 |
| JP | 1-168382 A | 7/1989 |

(Continued)

OTHER PUBLICATIONS

Kajiwara, K. et al, "New Fibers from Japan", Mar. 30, 2009.

*Primary Examiner* — Christopher M Polley
(74) *Attorney, Agent, or Firm* — HPI Patent Department (57) ABSTRACT

Examples of a cover for a device are described herein. The cover includes a substrate to be placed in proximity of a heat source of a device. In an example, a heat resistant layer is applied over a surface of the substrate to insulate heat generated by the heat source. Further, a top layer is applied over one of the heat resistant layer and another surface of the substrate, which is opposite to the surface having the heat resistant layer. The top layer provides at least one of chemical resistant properties and aesthetic properties.

12 Claims, 7 Drawing Sheets

(56) References Cited

U.S. PATENT DOCUMENTS

| | | |
|---|---|---|
| 2006/0228967 A1 | 10/2006 | Gladfelter |
| 2012/0237775 A1* | 9/2012 | Kosugi .................... B05D 1/06 428/418 |
| 2014/0335337 A1 | 11/2014 | Lee et al. |
| 2015/0000884 A1 | 1/2015 | Jiang et al. |
| 2015/0140888 A1 | 5/2015 | Lee et al. |
| 2016/0016378 A1 | 1/2016 | Oikawa et al. |

FOREIGN PATENT DOCUMENTS

| | | |
|---|---|---|
| JP | 2015-157474 A | 9/2015 |
| TW | 250444 | 7/1995 |
| TW | 201524335 A | 6/2015 |
| WO | WO-2013179218 A1 | 12/2013 |

* cited by examiner

COVER FOR DEVICES

BACKGROUND

Devices, such as a laptop, a tablet personal computer (PC), and a mobile phone, have various components, which may heat up during operation. For instance, the components, such as a chip set, a power source, a processor, a printed circuit board, may get heated up on prolonged use. Further, the heating of the components may in turn cause the device to be heated up. Such heat generated by the device can be dissipated through the body of the device.

BRIEF DESCRIPTION OF FIGURES

The following detailed description references the drawings, wherein.

DETAILED DESCRIPTION

Generally, during operation of a device, heat may be generated by a component set including, for instance, a processor, a printed circuit board (PCB), or a power source. Usually, the heat from the component set may be transferred to a cover of the device. The cover may be composed of a heat conducting material to provide for dissipation of heat from the device. As a result, a user of the device may be exposed to the heat and may experience discomfort while handling the device.

The components may be provided with a heat insulation layer to prevent dissipation heat to the device. However, this may increase thickness of the various components, which in turn may result in space constraint. Lack of space may restrict the design flexibility, especially, in portable devices, such as tablets and mobile phones.

The present subject matter describes a cover for a device, a device with the cover, and a method for forming the cover. In an example, the cover may provide effective heat insulation from the device and, additionally, may prevent any discomfort to a user of the device.

According to an aspect of the present subject matter, the cover of the device may include a substrate, an inner surface, and an outer surface. In an example, when the cover is deployed, the inner surface faces a component set, which may generate heat during device operation. The outer surface, provided opposite to the inner surface, may face away from the component set, for instance, may face a user of the device.

The substrate may have multiple layers disposed thereon. The multiple layers include a heat resistant layer to insulate heat generated by the component set, when in operation, and a top layer to provide at least one of chemical resistance and aesthetic appeal to the cover. The heat resistant layer may be disposed over one of the inner surface and the outer surface of the cover. In an example, when the heat resistant layer is disposed on the outer surface, the top layer may be disposed over the heat resistant layer. Otherwise, the top layer may be directly disposed over the outer surface of the cover with the heat resistant layer being disposed over the inner surface exposed to the component set.

While the top layer may provide chemical resistance properties and/or aesthetic properties, the heat resistant layer prevents or minimizes transfer of heat from the component set to the outer surface of the cover. Thus, the heat resistant layer prevents formation of hot spots on the cover. The heat resistant layer also facilitates effective heat insulation, and thus, protects the user of the device from discomfort due to accumulation of heat at certain regions. Additionally, the heat resistant layer may eliminate additional insulating layers in the device and on the component sets, thus saving space. This, in turn, may provide flexibility in designing the device.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
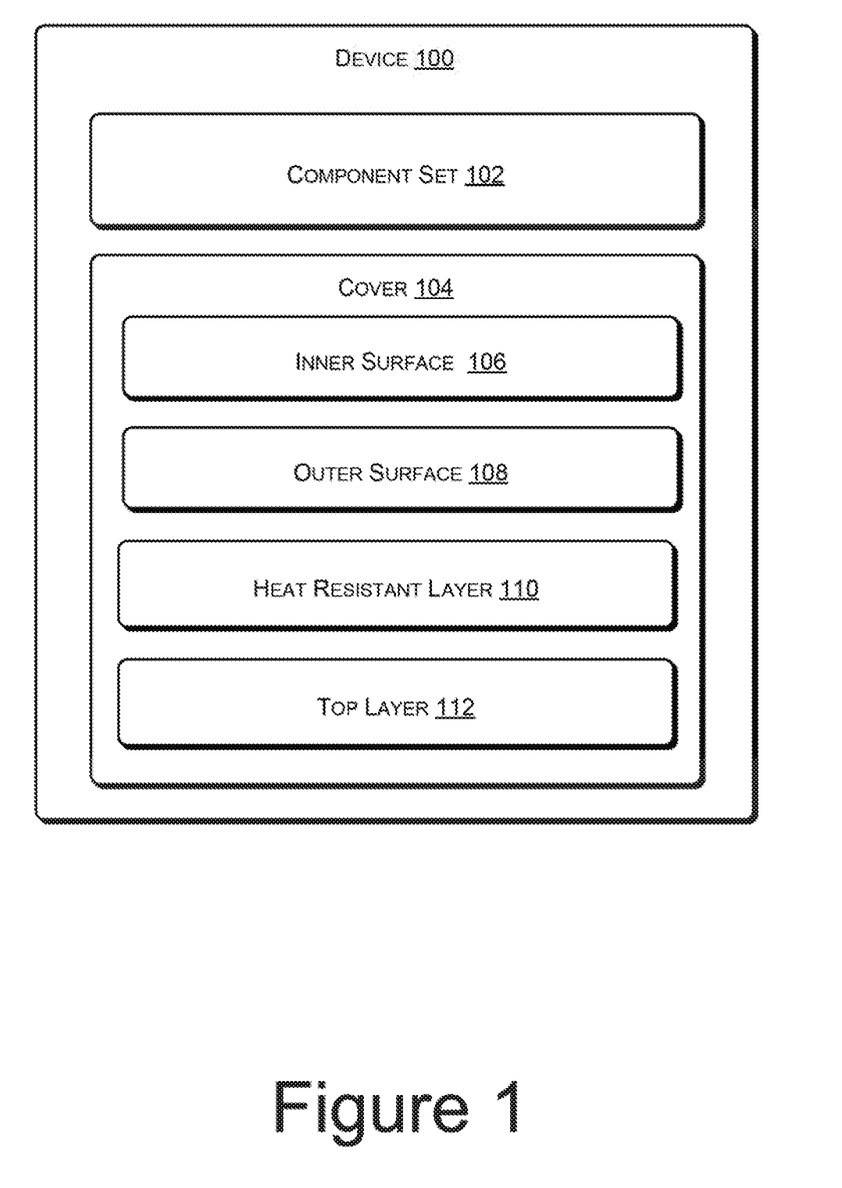
FIG. 1 illustrates a schematic of a device having a cover, in accordance with an example implementation of the present subject matter.

FIG. 1 illustrates a schematic of a device 100, according to an example implementation of the present subject matter. The device 100 may be an electronic device including a personal computer (PC), a laptop, a tablet PC, a mobile phone, and a charging device of the aforementioned devices. Further, the device 100 may include a component set 102 and a cover 104. The component set 102 may include, for example, a battery, a processor, a PCB, a motherboard, and a chipset, of the device 100 which may generate heat during operation of the device 100. In other words, the component set 102 may be a heat source which may generate heat during the operation of the device 100. For example, when the device 100 is operated for long durations, the battery or power source of the device 100 may heat up and emit the heat. In another example, over prolonged use, the chipset or the processor of the device 100 may start emitting heat, for instance, due to internal resistance of various components of the chipset or the processor to the passage of current through them.

Further, the cover 104 of the device 100 may be a part of a body of the device 100 and may insulate the heat generated by the component set 102. In another example, the cover 104 may be separately provided on the device 100. In addition, the cover 104 may provide for convenience of use of the device 100 to the user without feeling any discomfort due to the heat. The cover 104 may have an inner surface 106 to face the component set 102 and an outer surface 108 opposite to the inner surface 106.

In an example implementation, the cover 104 may be provided with certain structural features for the aforementioned purpose. For example, the cover 104 may be provided with multiple layers thereon. The cover 104 may include a heat resistant layer 110 to insulate the heat generated by the component set 102. The heat resistant layer 110 may be provided on one of the inner surface 106 and the outer surface 108. Further, the insulation from the surrounding may reduce accumulation of heat at areas of the cover 104 corresponding to the component set 102. Overheating of the component set 102 may be prevented by way of internal heat convection.

In addition to the heat resistant layer 110, the cover 104 may also include a top layer 112, which may be provided as the outermost layer on the cover 104. The top layer 112 may be disposed over the heat resistant layer 110, when the heat resistant layer 110 is disposed over the outer surface 108. Alternatively, the top layer 112 may be disposed directly over the outer surface 108, when the heat resistant layer 110 is provided on the inner surface 106. The top layer 112 may include at least one of a hydrophobic layer, an antibacterial layer, an anti-smudge layer, a surface texture layer, and a color layer.

Figure 2:
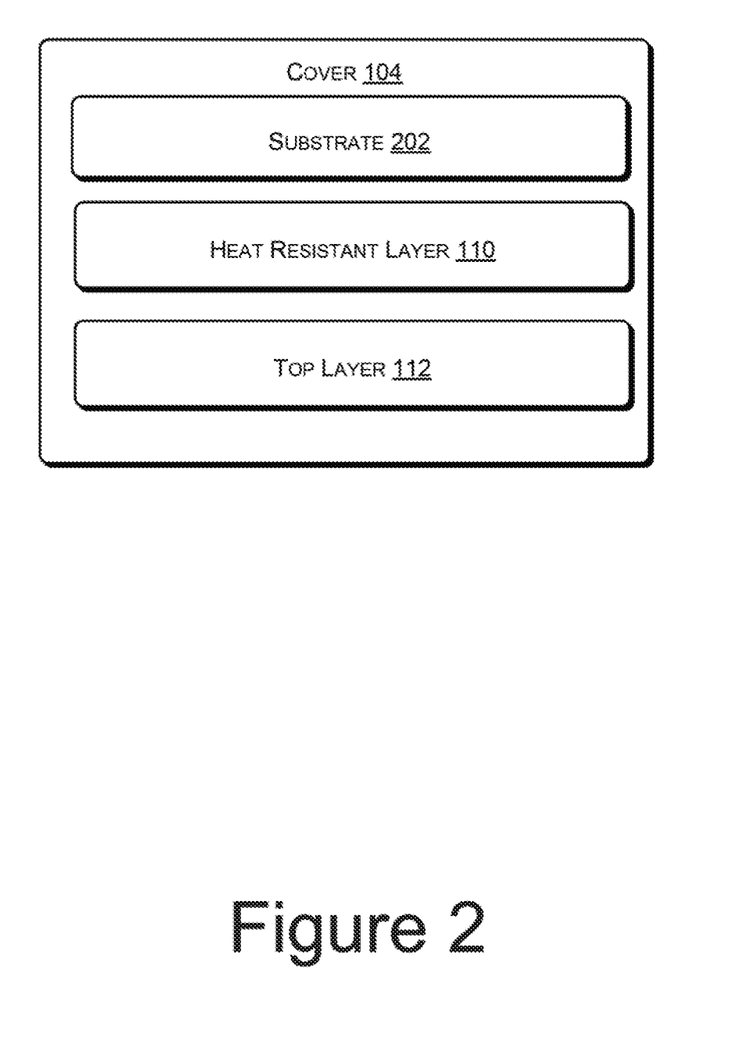
FIG. 2 illustrates a schematic of the cover, in accordance with an example implementation of the present subject matter.

FIG. 2 illustrates a schematic of the cover 104, in accordance with an example implementation of the present subject matter. As mentioned previously, the cover 104 provides insulation from the heat generated by the component set 102 and prevents discomfort, due to the heat, to the user operating the device 100. The cover 104 may be a detachable or non-detachable part of the body of the device 100. In an example, the cover 104 may be a battery cover of a mobile device or a tablet PC. In another example, the cover 104 may be a bottom plate of a laptop. In yet another example, the cover 104 may be a casing provided for a charging device.

In one example, the cover 104 includes a substrate 202, the heat resistant layer 110, and the top layer 112. The substrate 202 may be a skeleton structure of the cover 104 over which the coatings may be applied. During operation of the device 100, the substrate 202 may be in proximity to a heat source, such as the component set 102. A surface of the substrate 202 that faces the component set 102 corresponds to the inner surface 106 and another surface of the substrate 202 that faces away from the component set 102, i.e., the surface that is exposed to surroundings and comes in contact with the user corresponds to the outer surface 108. The substrate 202 may comprise a metal, a metal alloy, a polymer, a carbon fiber, a ceramic, and a composite material, to provide sturdiness and durability to the cover 104. In an example, the substrate 202 includes one of aluminum, magnesium, zinc, titanium, niobium, carbon steel, stainless, copper, iron, and silicon carbide.

The substrate 202 includes the heat resistant layer 110 to provide insulation from heat to a user handling the device 100. The heat resistant layer 110 may be provided on the inner surface 106 or the outer surface 108. In case the heat resistant layer 110 is provided on the inner surface 106, transfer of the heat to the outer surface 108, and thus to the user, is minimized or completely avoided. Further, in another example, the heat resistant layer 110 is provided on the outer surface 108, the heat from the component set 102 may be transferred from the inner surface 106 to the outer surface 108, where further dissipation is prevented by the heat resistant layer 110. Alternatively, the heat resistant layer 110 may be provided on both the inner surface 106 as well as the outer surface 108.

The heat resistant layer 110 may include one or more heat insulators, for example, mineral-based insulators, fiber-glass based insulators, cellular glass based insulators, cellulose-based insulators, polymeric foam-based insulators, polymeric resin-based insulators, and silica-based insulators to provide for heat insulation. For instance, the mineral-based insulators may include mineral wools, ceramic fiber, glass, and stone; the silica-based insulators may include, in portion or in entirety, silica, calcium silicate, or vermiculite; and the polymeric foam-based insulators may include elastomeric foam, phenolic foam, polystyrene foam, and polyurethane foam.

The heat resistant layer 110 may further include one or more fillers, such as carbon black, carbon nanotubes (CNT), graphene, graphite, titanium dioxide, aluminum oxide, barium sulfate, calcium carbonate, clay, mica, dyes, synthetic pigments, talc, metallic powders, organic powders, color pigments and inorganic powders.

The heat resistant layer 110 may include a heat resistant base layer. In an example, the heat resistant base layer may be a layer disposed directly over a surface to insulate the heat, or may be disposed over a heat resistant primer layer. Further, in another example, the heat resistant base layer may function as a base layer for the top layer 112. The heat resistant base layer may include at least one of a heat resistant spray layer and a heat resistant powder layer. The heat resistant powder layer may adhere to the substrate 202 due to electrostatic charging of powder. Further, the heat resistant spray layer may be spray coated to the substrate 202. The heat resistant layer 110 may also include a heat resistant primer layer.

In an example, the heat resistant layer 110 may have a thickness in a range of about 20 micrometer ($\mu m$) to 640 $\mu m$, while the top layer 112 may have a thickness in a range of about 15 $\mu m$ to about 60 $\mu m$. The top layer 112 may be disposed over the heat resistant layer 110 or directly over the outer surface 108. Thus, in one example, the heat resistant layer 110 may be sandwiched between the top layer 112 and the substrate 202; while, in another example, the substrate 202 may be sandwiched between the heat resistant layer 110 and the top layer 112.

The top layer 112 may provide chemical resistance to the cover 104. Further, the top layer 112 may also impart aesthetic properties by providing various cosmetic surfaces, such as a colored surface, a hydrophobic surface, a silky surface, a soft touch surface, and a matte finish surface. In an example, hydrophobic top coat formulation may include a group of hydrophobic polymers, which contains a fluoropolymer coating selected from fluorinated olefin-based polymers, specialty fluoroacrylates, fluorosilicone acrylates, fluorourethanes, perfluoropolyethers/perfluoropolyoxetanes, fluorotelomers (C-6 or lower products), polytetrafluoroethylene (PTFE), polyvinylidenefluouride (PVDF), fluorosiloxane, fluoro UV polymers and hydrophobic polymers (C-7 or longer). Thus, the cover 104 in addition to providing heat insulation, may also be aesthetically appealing.

FIGS. 3A-3E illustrate a cross sectional view of the cover 104, according to various example implementations of the present subject matter. For the sake of brevity, description of FIGS. 3A-3E is provided with reference to the heat resistant layer 110 being provided on the outer surface 108 of the cover 104. It will be appreciated that the similar principles may be extended to a case where the heat resistant layer 110 is provided on the inner surface 106 and the top layer 112 is provided on the outer surface 108.

Figure 3A:
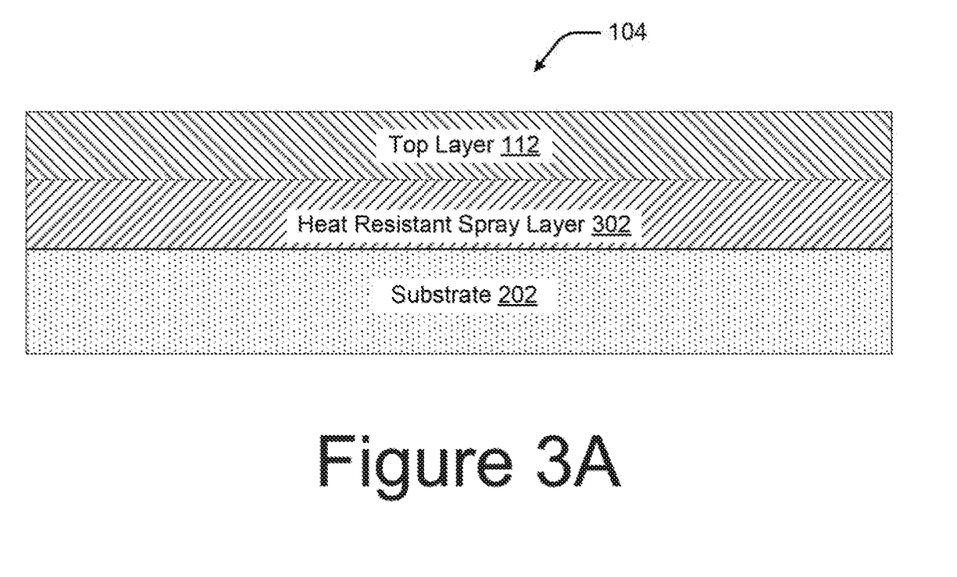
FIGS. 3A-3E illustrate sectional views of the cover, in accordance with various example implementations of the present subject matter.

Referring to FIG. 3A, a sectional view of the cover 104 of the device 100 is illustrated, in accordance with an example implementation of the present subject matter. On the outer surface 108 of the substrate 202, a heat resistant spray layer 302 is applied. The substrate 202 may include a metal, a plastic, a carbon fiber, a ceramic or composites. The heat resistant spray layer 302 functions as the heat resistant layer 110 described above. The heat resistant spray layer 302 may have a thickness in a range of about 20 $\mu m$-300 $\mu m$ The heat resistant spray layer 302 includes, for instance, one or more of barium sulfate, talc, dyes, and color pigments in combination with heat insulating materials. The material forming the heat resistant spray layer 302 may be spray coated on the substrate 202 to form the heat resistant spray layer 302.

As illustrated, the top layer 112 may be applied over the heat resistant spray layer 302. The top layer 112 provides for chemical resistance properties, such as anti-microbial properties, anti-smudge properties, corrosion resistance properties, and water resistance properties. Additionally or alternatively, the top layer 112 may provide for aesthetic properties, for example, the top layer 112 may include a color coating or a coating to impart certain texture, such as silky and matte, to the cover 104.

Figure 3B:
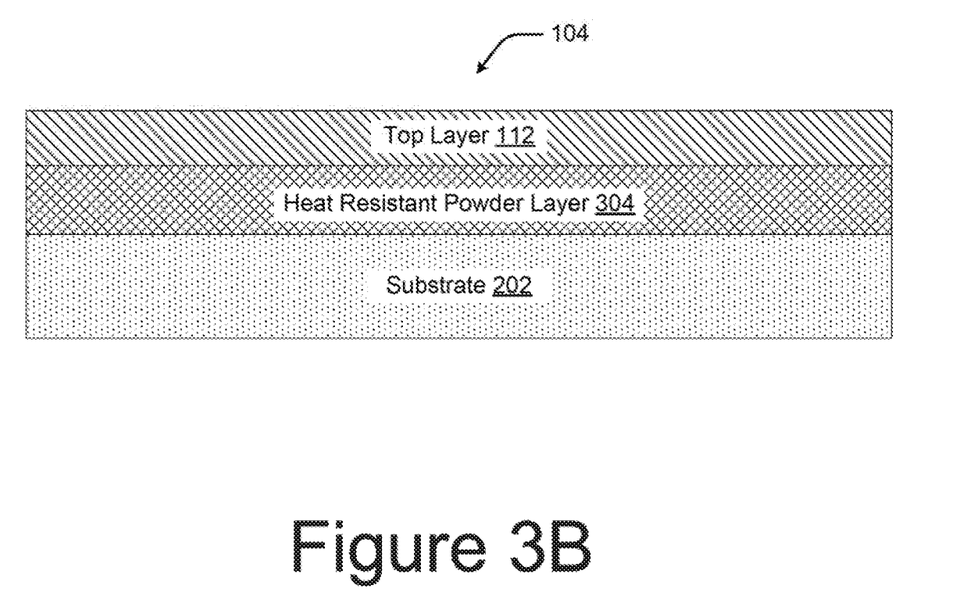

FIG. 3B illustrates the sectional view of the cover 104, in accordance with another example implementation of the present subject matter. On the outer surface 108 of the substrate 202 a heat resistant powder layer 304 is disposed. The heat resistant powder layer 304 may have a thickness in a range of about 30 μm-300 μm. The heat resistant powder layer 304 includes fillers, such as carbon black, titanium dioxide, clay, mica, talc, barium sulfate, calcium carbonate, synthetic pigments, metallic powders, aluminum oxide, CNT, graphene, graphite, and organic and inorganic powders in combination with heat insulating materials.

In an example implementation, the heat resistant powder adheres to the substrate 202 due to electrostatic charging of the powder. In said example, the substrate 202 may be of any material, which may tolerate the heat of curing the heat resistant powder and may be electrically grounded to enhance the charged particle attachment. For instance, in case the substrate 202 is of a ceramic material, an electronically conductive layer may be applied on the outer surface 108 prior to powder treatment. Likewise, in case the substrate 202 is a composite material and does not include a metal, a similar electronically conductive layer may be applied on the outer surface 108. On the other hand, in case the substrate 202 comprises metal, the electronically conductive layer may be avoided.

In the example implementation of FIG. 3B, the heat resistant powder flows and cures during the application of heat to form the heat resistant powder layer 304. In addition, heat resistant powder may be recovered for reuse with no volatile organic compound (VOC) generation. Further, the top layer 112 may be provided in the same manner as described with reference to FIG. 3A.

Figure 3C:
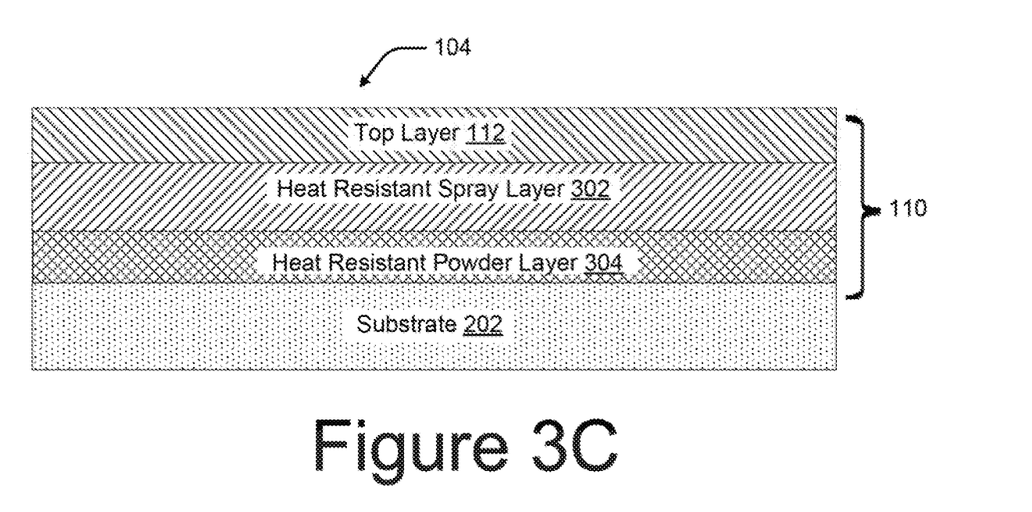

FIG. 3C illustrates the sectional view of the cover 104, in accordance with another example implementation of the present subject matter. The heat resistant powder layer 304 is disposed over the outer surface 108 of the substrate 202. An additional layer, the heat resistant spray layer 302 is disposed over the heat resistant powder layer 304. The heat resistant powder layer 304 and the heat resistant spray layer 302 together form the heat resistant layer 110. Further, the top layer 112 may be provided in the same manner as described with reference to FIG. 3A.

Figure 3D:
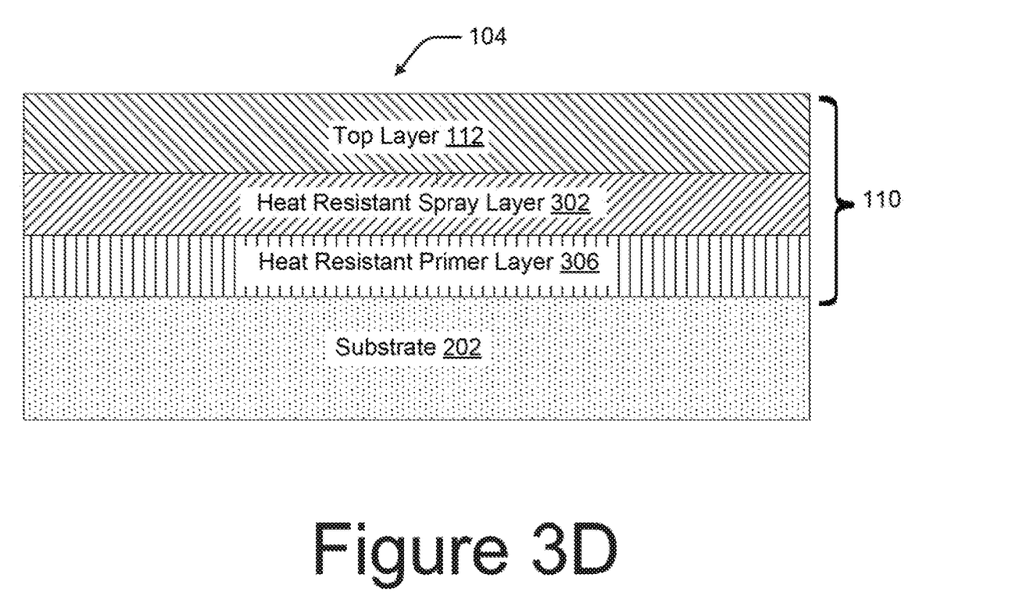

Further, FIG. 3D illustrates the sectional view of the cover 104, in accordance with another example implementation of the present subject matter. The heat resistant primer layer 306 may be disposed on the outer surface 108 of the substrate 202. The heat resistant primer layer 306 may have a thickness in a range of about 20 μm-40 μm The heat resistant primer layer 306 includes fillers, such as carbon black, titanium dioxide, clay, mica, talc, barium sulfate, calcium carbonate, synthetic pigments, metallic powders, aluminum oxide, CNT, graphene, graphite, and organic and inorganic powders, in combination with heat insulating materials. Additionally, the heat resistant spray layer 302 may be applied over the heat resistant primer layer 306 to form the heat resistant layer 110. The top layer 112 may be provided in the same manner as described with reference to FIG. 3A.

Figure 3E:
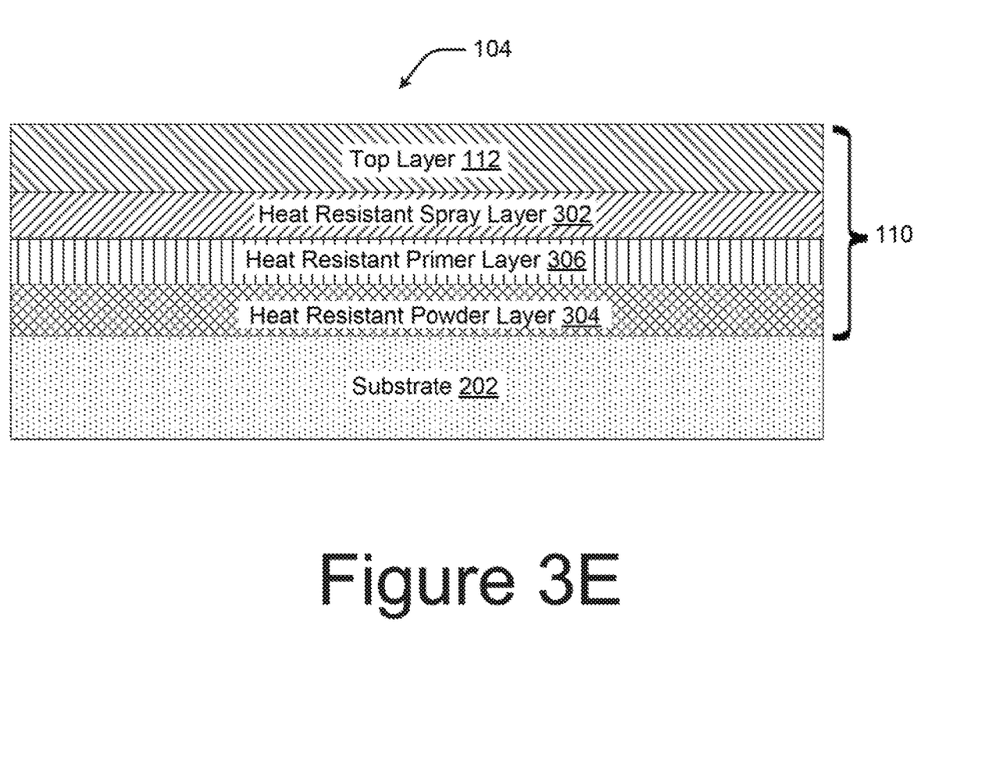

FIG. 3E illustrates the sectional view of the cover 104, in accordance with yet other example implementation of the present subject matter. The heat resistant powder layer 304 is disposed over the substrate 202. The heat resistant primer layer 306 may be disposed over the heat resistant powder layer 304, and the heat resistant spray layer 302 may be disposed over the heat resistant primer layer 306. The three layers may together form the heat resistant layer 110. Further, as mentioned in FIGS. 3A-3D, the top layer 112 may be provided as the final coat.

Figure 4:
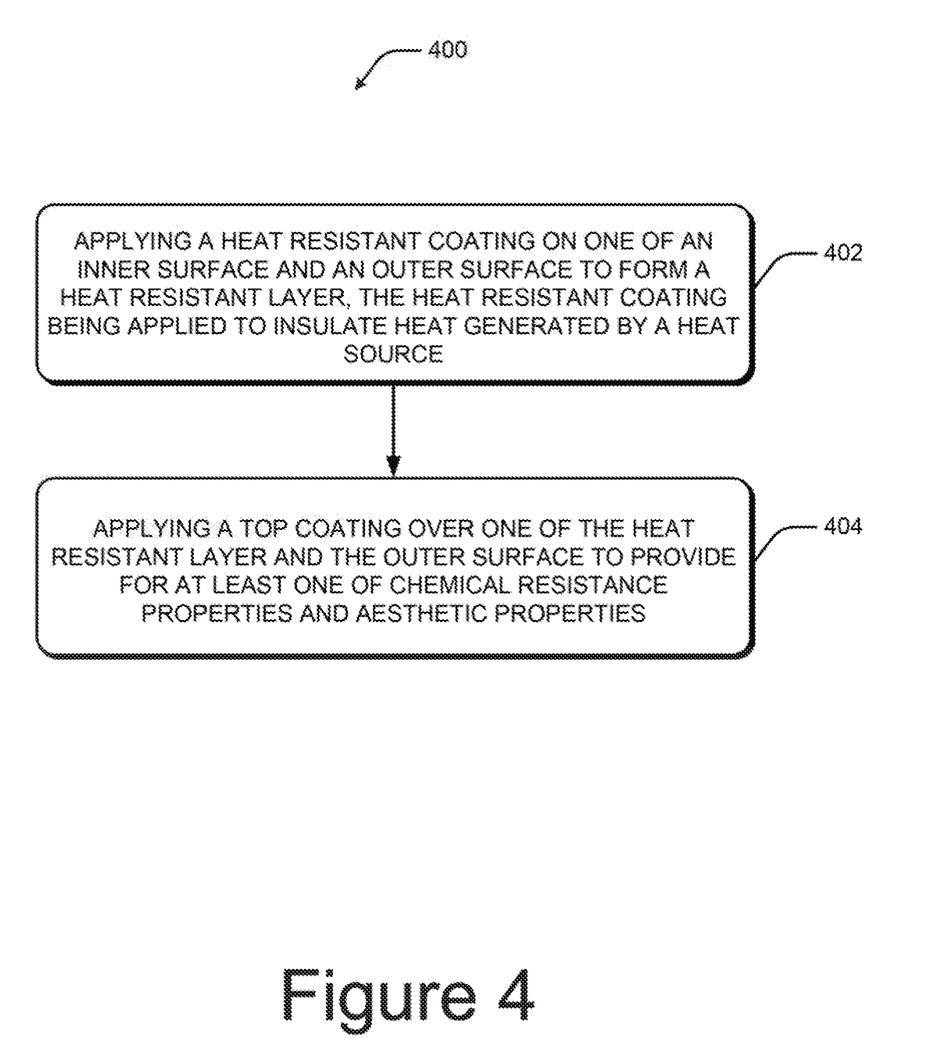
FIG. 4 illustrates a method for fabricating the cover, in accordance with an example implementation of the present subject matter.
Figure 5:
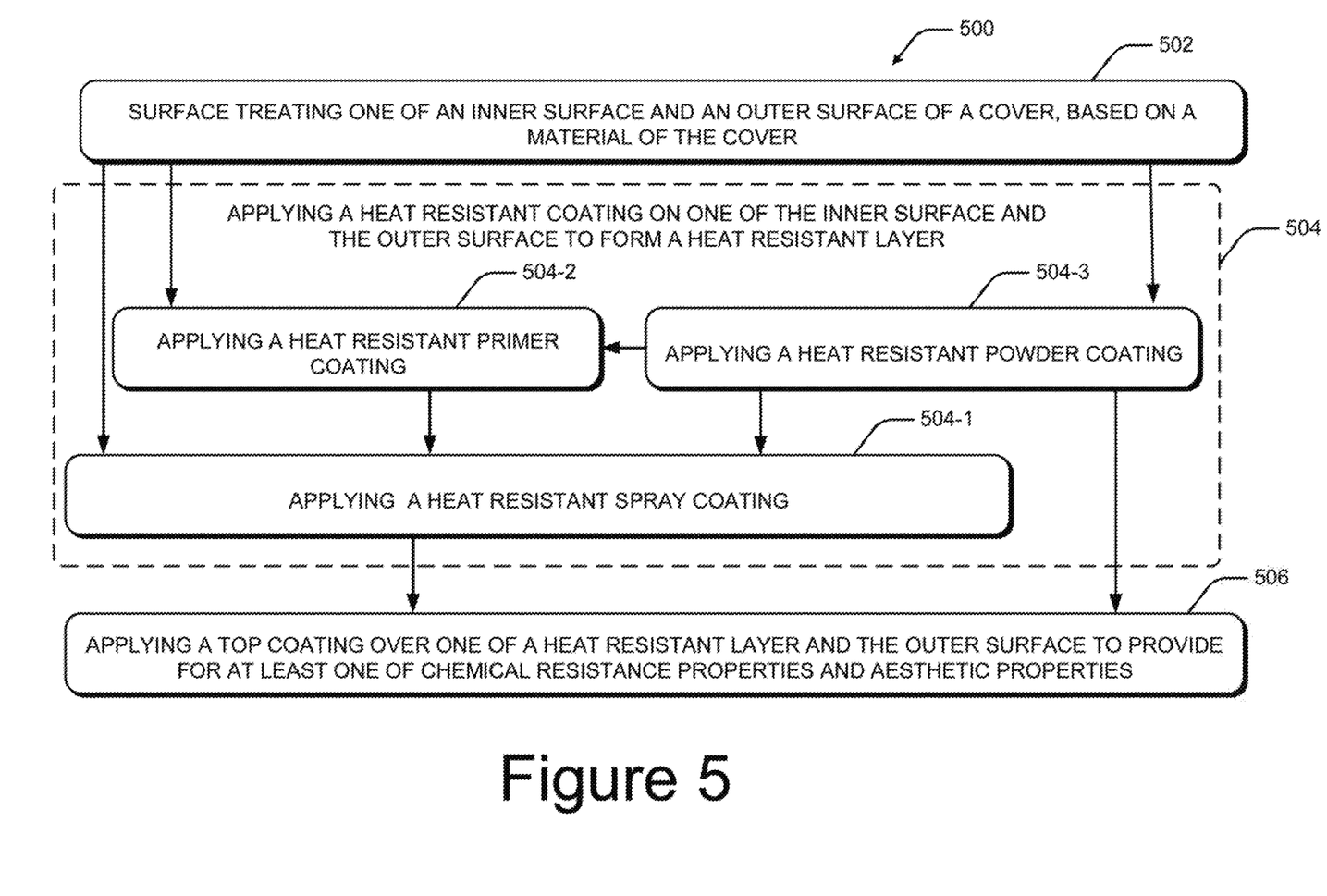
FIG. 5 illustrates a method for fabricating the cover, in accordance with another example implementation of the present subject matter.

FIG. 4 illustrates a method 400 for fabricating a cover, such as the cover 104 for the device 100, in accordance with an example implementation of the present subject matter. Further, FIG. 5 illustrates a method 500 for fabricating a cover, in accordance with another example implementation of the present subject matter. The order in which the methods are described is not intended to be construed as a limitation, and any number of the described method blocks can be combined in any appropriate order to execute the methods. Additionally, individual blocks may be deleted from the methods without departing from the spirit and scope of the subject matter described herein.

Referring to block 402, a heat resistant coating may be applied on one of an inner surface and an outer surface of the cover to form a heat resistant layer, such as the heat resistant layer 110. The heat resistant layer is provided to insulate heat generated by a component set, such as the component set 102, which may function as a heat source during operation of the device 100.

At block 404, a top coating over one of the heat resistant layer and the outer surface to provide for at least one of chemical resistant properties and aesthetic properties. In an example, the top coating is applied on the outer surface when the heat resistant layer is applied over the inner surface. Thus, when the heat resistant layer is provided on the outer surface, the top coating is provided on the heat resistant layer.

Referring to FIG. 5, at block 502, at least one of an inner surface and an outer surface of the cover is surface treated prior to applying a heat resistant coating. The type of surface treatment, which is to be performed is based on a material of a substrate of the cover. For instance, in case the substrate comprises a metal, polishing, degreasing, activation, and neutralization may be performed in addition to surface cleaning.

At block 504, subsequent surface treatment, a heat resistant layer is disposed on the treated surface. The heat resistant layer may be formed in a variety of ways as described below.

In one example, at block 504-1, a heat resistant spray coating, such as the heat resistant spray layer 302, is applied on the cover to form the heat resistant layer.

In another example, a heat resistant primer coating, such as the heat resistant primer layer 306, is applied on the cover, as illustrated at block 504-2, and over the heat resistant primer coating, the heat resistant spray coating of block 504-1 is applied to form the heat resistant layer.

In yet another example, as illustrated at block 504-3, a heat resistant powder coating, such as the heat resistant powder layer 304 is applied to the cover to form the heat resistant layer.

In another example, subsequent to applying the heat resistant powder coating of block 504-3, the heat resistant spray coating of block 504-1 is applied to form the heat resistant layer.

In yet another example, subsequent to applying the heat resistant powder coating of block 504-3, the heat resistant primer coating may be applied. Further, the heat resistant spray coating is applied over the heat resistant primer coating to form the heat resistant layer.

On forming the heat resistant layer, at block 506, a top layer is applied on the heat resistant layer. The top layer provides for chemical resistance, aesthetic properties, or both. The top layers includes, for instance, at least one of a hydrophobic layer, an antibacterial layer, an anti-smudge layer, a surface texture layer, and a color layer.

Although examples for the cover for the device, the device having the cover, and the methods for fabricating the covers have been described in language specific to structural features and/or methods, it is to be understood that the appended claims are not limited to the specific features or methods described. Rather, the specific features and methods are disclosed as examples for the cover, the device, and the methods for fabricating the covers.

What is claimed is:

1. A cover for a device, the cover comprising:
   a substrate to be placed in proximity to a heat source of the device;
   a heat resistant layer applied over a surface of the substrate to insulate heat generated by the heat source, wherein the heat resistant layer comprises:
      a heat resistant powder layer disposed over the surface of the substrate,
      a heat resistant primer layer disposed over the heat resistant powder layer, and
      a heat resistant spray base layer disposed over the heat resistant primer layer; and
   a top layer applied over one of the heat resistant layer or another surface of the substrate, the another surface being opposite to the surface having the heat resistant layer, to provide at least one of chemical resistant properties or aesthetic properties.

2. The cover as claimed in claim 1, wherein the heat resistant layer comprises a heat resistant base layer, the heat resistant base layer including a heat resistant powder layer, a heat resistant spray layer, and the heat resistant spray layer disposed over the heat resistant powder layer.

3. The cover as claimed in claim 1, wherein the heat resistant layer comprises:
   a heat resistant primer layer disposed over the surface of the substrate; and
   a heat resistant spray base layer disposed over the heat resistant primer layer.

4. The cover as claimed in claim 1, wherein the heat resistant layer comprises at least one of mineral-based insulators, fiber-glass based insulators, cellular glass based insulators, cellulose-based insulators, polymeric foam-based insulators, polymeric resin-based insulators, or silica-based insulators.

5. The cover as claimed in claim 1, wherein the substrate is one of a metal, a metal alloy, a polymer, a carbon fiber, a ceramic, or a composite material.

6. The cover as claimed in claim 1, wherein the top layer comprises at least one of a hydrophobic layer, an antibacterial layer, an anti-smudge layer, a surface texture layer, or a color layer.

7. The cover as claimed in claim 1, wherein a thickness of the top layer is in a range of about 15 micrometer (μm) to about 60 μm, and a thickness of the heat resistant layer is in a range of about 20 μm to 640 μm.

8. The cover as claimed in claim 1, wherein the heat resistant layer comprises at least one of carbon black, carbon nanotubes (CNT), graphene, graphite, titanium dioxide, aluminum oxide, barium sulfate, calcium carbonate, clay, mica, dyes, synthetic pigments, talc, metallic powders, organic powders, color pigments or inorganic powders.

9. A device comprising:
   a component set generating heat during operation of the device; and
   a cover to insulate the heat generated by the component set, the cover comprising,
      an inner surface facing the component set;
      an outer surface opposite the inner surface;
      a heat resistant layer disposed over one of the inner surface or the outer surface to insulate the heat generated by the component set, wherein the heat resistant layer comprises:
         a heat resistant powder layer disposed over the surface of the substrate,
         a heat resistant primer layer disposed over the heat resistant powder layer, and
         a heat resistant spray base layer disposed over the heat resistant primer layer; and
      a top layer to provide at least one of chemical resistant properties or aesthetic properties to the cover, the top layer being disposed over one of:
         the outer surface; or
         the heat resistant layer, when the heat resistant layer is disposed over the outer surface.

10. The device as claimed in claim 9, wherein the heat resistant layer comprises at least one of a heat resistant base layer, the heat resistant base layer including a heat resistant powder layer, a heat resistant spray layer, or the heat resistant spray layer disposed over the heat resistant powder layer.

11. A method to fabricate the cover for a device of claim 1, the cover being heat insulating and including an inner surface to face a heat source of the device, and an outer surface opposite to the inner surface, wherein the method comprises:
   applying the heat resistant coating on one of the inner surface or the outer surface to form a heat resistant layer, the heat resistant layer to insulate heat generated by the heat source; and
   applying the top coating over one of the heat resistant layer or the outer surface to provide for at least one of chemical resistant properties or aesthetic properties, the top coating being applied on the outer surface, when the heat resistant layer is applied over the inner surface.

12. The method as claimed in claim 11, wherein the method further comprises surface treating one of the inner surface or the outer surface of the cover prior to applying the heat resistant coating, wherein a type of the surface treatment is based on a material of the cover.

* * * * *